Dec. 27, 1927.　　　　　　　　　　　　　　　　　1,653,759
E. CARETTA
LIQUID LEVEL INDICATOR
Filed March 18, 1925

Inventor
E. Caretta
by Langner, Parry, Card & Langner
Attys

Patented Dec. 27, 1927.

1,653,759

UNITED STATES PATENT OFFICE.

ETTORE CARETTA, OF TURIN, ITALY.

LIQUID-LEVEL INDICATOR.

Application filed March 18, 1925, Serial No. 16,528, and in Italy March 24, 1924.

The present invention relates to level indicating apparatus for liquid storage tanks of the kind in which a member is arranged to be shifted vertically under manual control in a tank along a supporting rod and means are provided to cause said member to be locked with said supporting rod on reaching the liquid level to stop the said manual control and give thereby an indication at the outside of the liquid level.

The present invention has for its object the construction of the member mounted to move in the tank.

Figure 1:
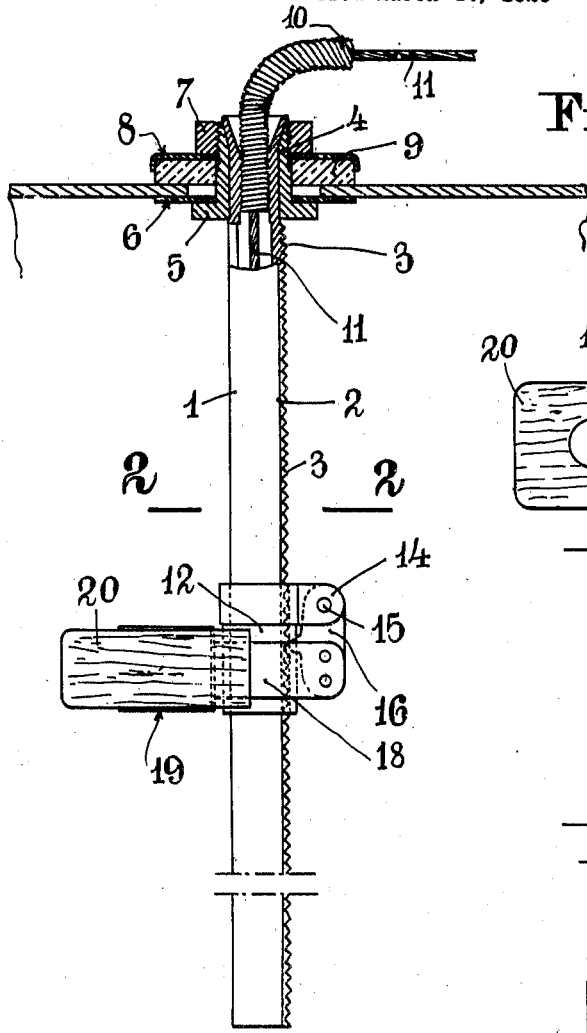
Figure 2:
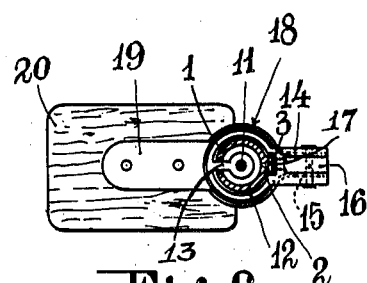
Figure 3:
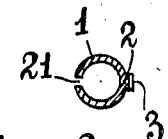
Figure 4:
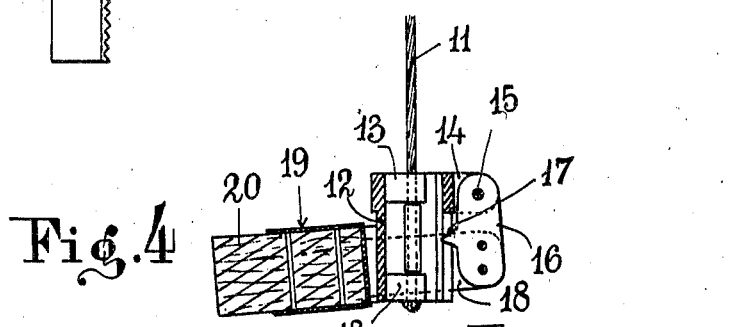

On the annexed drawing is shown by way of example an embodiment of the present invention and Figure 1 is a side view of the same with parts in section, Figure 2 is a plan section on line 2—2 of Figure 1, Figure 3 is a transverse section of the supporting member for said movable member and Figure 4 is the central section of the member carrying the float.

As shown on the drawing, the said supporting member consists of a hollow metal rod 1 C-shaped in cross section and on whose outer surface are provided teeth 3 in a longitudinal rib 2 projecting from the outer surface of said rod. Said rod has at its top end a screw threaded head 4 having a flange 5 adapted to abut on the surface of the tank wall, a washer 6 being arranged intermediate said flange and wall and the parts being clamped in position by means of a nut 7 and a washer 8 with a packing 9. The head 4 carries the sheath of a flexible transmission whose inner cord 11 passes in the hollow rod and is connected with a movable member carrying the float hereinafter described. Said movable member comprises a sleeve 12 which is longitudinally slotted on one side and is slidably located on the rod 1 in such a manner that the edges of its slot abut on the sides of the projecting rib 2. The sleeve 12 has inwardly projecting extensions or lugs 13 entering the slot 21 of the rod 1 and providing for connection with the end of the cord 11.

Between ears 14 of the sleeve 12 is pivoted at 15 an arm 16 having tooth 17 intended to engage teeth 3 of the rib 2 and on the arm 16 are fastened the end ears of a split collar 18 embracing said sleeve 12. From the edges of said collar 18, at points opposite said ears, project two parallel wings 19 between which is engaged a float 20 formed of an elongated piece of cork.

Assuming the float to be out of the liquid the sleeve 12 may be shifted down along the rod 1 by the manipulation of the cord 11 until the float 20 rests on the liquid surface. Then the float 20 is caused to rise with respect to the sleeve 12 and it causes tooth 17 to engage teeth 3 and thus lock the sleeve 12 on said supporting member 1. The float 20 and sleeve 12 may be raised again by a pull on the cord 11, which pull, owing to the relative positions of tooth 17 and pivot 15, causes said tooth 17 to disengage the rib teeth 3.

In this construction the float carrying sleeve 12 is correctly guided along the rod 1 and therefore no jamming action may take place, while the rib 2 of the rod 1 provides for large teeth ensuring a safe locking action of tooth 17.

Further the arms 13 connecting the sleeve 12 with the cord 11 may be made of thin material as they have not to withstand heavy stresses for holding the sleeve 12 in position, said sleeve being guided by its edges abutting on the sides of rib 2, and therefore the slot 21 of the rod 1 for the passage of said lugs 13 may be made narrow to prevent the cord 11 from coming out of the rod 1 through said slot when a thrust is exerted on it to move down the sleeve 12 and the float 20.

The wings 19 for fastening the float 20 make easy the mounting of this latter and the position of the float in combination with its elongated shape provides for an easy introduction of the said float into the tank even in case this tank has a comparatively restricted hole. For the purpose of inserting said float in position it is sufficient to carry it at the lower end of the guide 1 and to introduce it, while in inclined position with respect to the rod 1, through the hole of the tank wall which wall is of course thin.

The rod 1 having the sectional shape shown in Figure 3 in which the toothed rib 2 is opposite to the slot 21, is of advantage in that at the time the sleeve 12 is locked on said supporting rod 1, no movement of the sleeve can take place that would tend to force the cord 11 out of the hollow of said rod 1 through the slot 21.

What I claim as my invention and desire to secure by United States Letters Patent is:—

1. A level indicating apparatus for liquid storage tanks, comprising a tank, a hollow rod extending in said tank, said rod having a longitudinal slot and an outer longitudinal toothed rib, a sleeve embracing said rod and arranged to slide therealong, inner lugs on said sleeve extending through said slot in said rod, a manipulating member located in the hollow of said rod and having one end connected with said lugs, an arm pivoted on said sleeve and having a tooth arranged to engage said toothed rib, and a float cooperating with said pivoted arm to bring the said tooth of said arm into engagement with said toothed rib upon said float being shifted relative to said sleeve by its buoyancy upon it being moved into the liquid.

2. A level indicating apparatus for liquid storage tanks, comprising a tank, a hollow rod extending in said tank, said rod having a longitudinal slot and an outer longitudinal toothed rib, a sleeve embracing said rod and arranged to slide therealong, inner lugs on said sleeve extending through said slot in said rod, manipulating a member located in the hollow of said rod and having one end connected with said lugs, a float, means pivotally mounting said float on said sleeve and having a tooth arranged to engage said toothed rib and to lock said sleeves and float to said rod upon said float being shifted relative to said sleeve by its buoyancy upon it being moved into the liquid.

3. A level indicating apparatus for liquid storage tanks, comprising a tank, a hollow rod extending in said tank, said rod having a longitudinal slot and an outer longitudinal toothed rib opposite to said slot, a sleeve embracing said rod and arranged to slide along said rod, inner lugs on said sleeve extending through said slot in said rod, a manipulating member located in the hollow of said rod and having one end connected with said lugs, a float, means pivotally mounting said float on said sleeve and having a tooth arranged to engage said toothed rib and to lock said sleeve and float to said rod upon said float being shifted with respect to said sleeve by its buoyancy upon it being moved into the liquid.

4. A level indicating apparatus for liquid storage tanks, comprising a tank, a hollow rod extending in said tank, said rod having a longitudinal slot, a sleeve embracing said rod and arranged to slide along said rod, inner lugs on said sleeve extending through said slot in said rod, a manipulating member located in the hollow of said rod and having one end connected with said lugs, ears on said sleeve, a collar encircling said sleeve, an arm on said collar and pivoted in said ears, a float carried by said collar opposite to said arm, there being a longitudinal toothed rib on said rod and means on said arm to engage with the toothed rib of said rod and to lock said sleeve and float to said rod upon said float being shifted relative to said sleeve by its buoyancy upon it being moved into the liquid.

5. A level indicating apparatus for liquid storage tanks, comprising a tank, a hollow rod extending in said tank, said rod having a longitudinal slot, a sleeve embracing said rod and slidable along the same, inner lugs on said sleeve extending through said slot into said rod, a manipulating member located in the hollow of said rod and having one end connected with said lugs, ears on said sleeves, a collar encircling said sleeve, an arm fixed to said collar and pivoted in said ears, a pair of wings extending from said collar opposite to said arm, a float engaged with said wings, a longitudinal toothed rib on said rod and means on said arm for engaging said toothed rib and locking said sleeve and float to said rod upon said float being shifted relative to said sleeve by its buoyancy upon it being moved into the liquid.

6. A level indicating apparatus for liquid storage tanks, comprising a tank, a hollow rod extending in said tank, said rod having a longitudinal slot and an outer toothed rib opposite said slot, a sleeve embracing said rod and arranged to slide therealong, said sleeve having inner lugs extending through said slot in said rod, a manipulating member located in the hollow of said rod and having one end connected with said lugs, a depending arm pivoted on said sleeve on its side facing said toothed rib, a member fixed to said arm and loosely encircling said sleeve, a float connected with said last named member at its side remote from said arm, a tooth on the inner side of said arm arranged to engage said toothed rib to lock said sleeve and associated parts to said rod upon said float being shifted relative to said sleeve by its buoyancy upon it being moved into the liquid.

In testimony whereof I have signed my name to this specification.

ETTORE CARETTA.